US008861733B2

(12) United States Patent
Benteo et al.

(10) Patent No.: US 8,861,733 B2
(45) Date of Patent: Oct. 14, 2014

(54) METHOD OF PERSONALIZING A NFC CHIPSET

(75) Inventors: Bruno Benteo, Toulouse (FR); Benoit Feix, La Ciotat (FR); Sebastien Nerot, Peyrolles en Provence (FR)

(73) Assignee: Inside Secure, Aix-en-Provence, Cedex (FR)

( * ) Notice: Subject to any disclaimer, the term of this patent is extended or adjusted under 35 U.S.C. 154(b) by 1930 days.

(21) Appl. No.: 11/952,911

(22) Filed: Dec. 7, 2007

(65) Prior Publication Data

US 2009/0103732 A1     Apr. 23, 2009

(30) Foreign Application Priority Data

Oct. 23, 2007  (FR) ..................................... 07 07408

(51) Int. Cl.
| | |
|---|---|
| H04K 1/00 | (2006.01) |
| H04L 9/00 | (2006.01) |
| H04L 9/30 | (2006.01) |
| H04L 9/08 | (2006.01) |
| G06F 9/00 | (2006.01) |
| G06F 9/24 | (2006.01) |
| G06F 15/177 | (2006.01) |
| G06Q 20/34 | (2012.01) |
| G06Q 20/32 | (2012.01) |
| G07F 7/10 | (2006.01) |
| H04W 12/02 | (2009.01) |
| H04L 29/06 | (2006.01) |

(52) U.S. Cl.
CPC .......... *H04W 12/02* (2013.01); *G06Q 20/3558* (2013.01); *H04L 63/0442* (2013.01); *G06Q 20/3278* (2013.01); *H04L 63/0492* (2013.01); H04L 63/20 (2013.01); H04L 63/18 (2013.01); *G06Q 20/3552* (2013.01); *G07F 7/1008* (2013.01); *G06Q 20/32* (2013.01); *H04L 63/0876* (2013.01)
USPC ............... 380/270; 380/30; 380/44; 380/278; 713/1

(58) Field of Classification Search
USPC ............ 380/270, 279, 282, 283, 44; 713/1–2, 713/100, 168–171, 180–181; 726/3, 26–30
See application file for complete search history.

(56) References Cited

U.S. PATENT DOCUMENTS

| | | | | |
|---|---|---|---|---|
| 5,689,565 | A * | 11/1997 | Spies et al. .................... | 713/189 |
| 2005/0203582 | A1* | 9/2005 | Healy et al. ..................... | 607/31 |

(Continued)

FOREIGN PATENT DOCUMENTS

| | | |
|---|---|---|
| EP | 1 802 148 A1 | 6/2007 |
| EP | 1 860 840 A2 | 11/2007 |

OTHER PUBLICATIONS

"MasterCard announces NFC trial in Dallas", Card Technology Today, Elsevier, vol. 18, No. 11-12, pp. 7, (2006).
Gerald Madlmayr et al., "The benefit of using SIM application toolkit in the context of near filed communication application", Sixth International Conference on the Management of Mobile Business, (2007).

(Continued)

*Primary Examiner* — Kambiz Zand
*Assistant Examiner* — Trong Nguyen
(74) *Attorney, Agent, or Firm* — Panitch Schwarze Belisario & Nadel LLP (57) ABSTRACT

The invention relates to a method for personalizing a secure processor in a NFC system to execute a secure application, comprising steps of obtaining by a server identification data of a user memorized in a secure storage medium, personalization data corresponding to the user identification data, and identification data of a NFC system of the user, comprising an encryption key of the secure processor, encrypting by the server personalization data using the encryption key, transmitting to the NFC system encrypted personalization data, receiving by the secure processor encrypted personalization data, deciphering personalization data, and memorizing in a secured way personalization data by the secure processor.

36 Claims, 5 Drawing Sheets

(56) References Cited

U.S. PATENT DOCUMENTS

2007/0116292 A1* 5/2007 Kurita et al. .................. 380/270
2008/0207203 A1* 8/2008 Arthur et al. ............... 455/435.1
2009/0183541 A1* 7/2009 Sadighi et al. .................. 70/263

OTHER PUBLICATIONS

Mikko Laukkanen, "Towards Operating Identity-based NFC Services", Pervasive Services, IEEE International Conference on IEEE, PI, pp. 92-95, (2007).

* cited by examiner

METHOD OF PERSONALIZING A NFC CHIPSET

BACKGROUND OF THE INVENTION

The present invention relates to a method for personalizing a NFC system or chipset (Near Field Communication) comprising a NFC interface circuit, particularly to execute a contactless secure application.

In the following description, "secure application" refers to an application implementing protection means preventing the execution of the application for non provided uses and by non authorized people. "Secure" memory or processor refers likewise to a memory or a processor equipped with means for preventing the access to the memory or control of the processor by non authorized people.

The NFC technology is currently developed by an industrial consortium gathered under the name of NFC Forum (http://www.nfc-forum.org). The NFC technology derives from the RFID technology (Radio Frequency Identification) and uses NFC components or processors having several operating modes, in particular a Reader Mode and a Card Emulation Mode.

In reader mode, a NFC processor operates like a conventional RFID reader to read or write access a RFID chip (contactless chipcard or tag). The NFC processor emits a magnetic field, sends data by modulating the amplitude of the magnetic field and receives data by charge modulation and inductive coupling. This mode is also referred to as active mode, since in this mode the NFC processor emits a magnetic field.

In the emulation mode, described by the patent EP 1 327 222 in the name of the applicant, a NFC processor operates in a passive way like a transponder to dialog with another reader and be seen by the other reader like a RFID chip. The processor does not emit any magnetic field, sends data by demodulating a magnetic field emitted by the other reader and emits data by modulating the impedance of the antenna circuit thereof (charge modulation). This mode is also referred to as passive mode, since in this mode the NFC processor does not emit any magnetic field.

Other communication modes may be implemented, in particular a device mode where a component must match another NFC processor in the same operating mode, each NFC processor alternately switch to a passive state (without emitting field) to receive data and to an active state (emitting field) to emit data.

In these three operating modes, a NFC processor may implement several contactless communication protocols, for example ISO 14443-A, ISO 14443-B, ISO 15693, Felica®, etc. Each protocol defines a transmitting frequency of the magnetic field, a method for modulating the amplitude of the magnetic field to emit data in active mode, and a method of charge modulation by inductive coupling to emit data in passive mode. A NFC processor may therefore be a multimode and multiprotocol device.

Due to the wide communication abilities thereof, a NFC processor is intended to be integrated into portable devices like mobile phones or PDAs (Personal Digital Assistants). A NFC system or chipset of the type shown in FIG. 1, under the reference NFCS1, is thus meant to be manufactured. The system NFCS1 comprises a NFC processor named NFCR1, and at least one first host processor HP1. Host processor refers to any integrated circuit comprising a microprocessor or a microcontroller and which is connected to a port of the NFC processor. In numerous applications, the NFC system also comprises a second host processor HP2, and sometimes a third one HP3.

The first host processor HP1 is the main processor of the device in which the NFC processor is embedded. It is usually a non secure processor, for example the baseband (or radio-telephony) circuit of a mobile phone which controls various peripheral elements of the phone, like the keyboard, the display, the transmitter, the receiver, etc.

The second host processor HP2 may be a secure circuit, for example the secure processor of a SIM card (Subscriber Identification Module) given by a mobile phone carrier, memorizing in particular a subscriber identifier.

The third host processor HP3 may also be a secure processor supplied by another service provider, for example for secure applications like an application of payment or access to a paying service. Such a host processor also memorizes an identifier of the user of the service.

The resources of the NFC processor are therefore put at the disposal of the processors HP1, HP2, HP3 to allow them to manage contactless applications. A NFC processor can thus manage the following applications.

Figure 1:
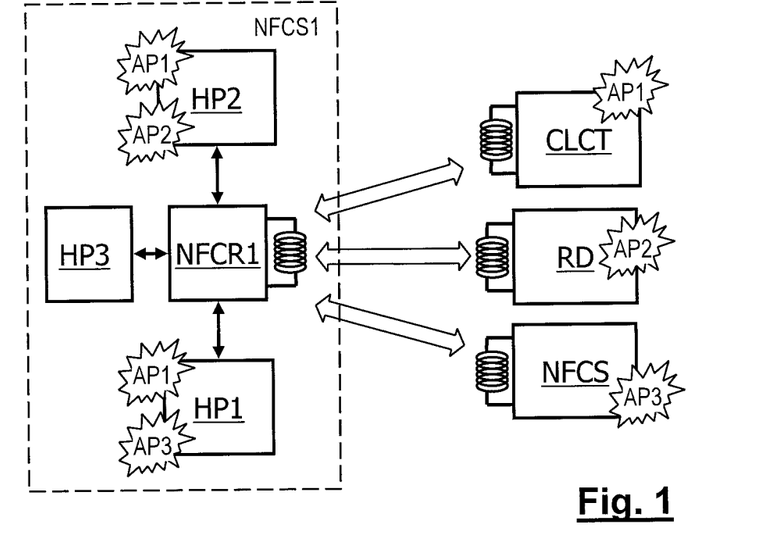
FIG. 1 previously described shows in block form a conventional architecture of NFC system, and contactless circuits with which the NFC system can dialog.

1) AP1 type applications wherein the NFC processor NFCR1 is in reader mode to read or write in a contactless integrated circuit CLCT. The system NFCS1 is in this case used like a RFID reader. This type of application may be free and for example consist in reading advertizing data inserted into an advertising display of a terminal. The application may also be paying and consist for example in reading information reserved to subscribers. The program of the application AP1 is preferably held and executed by the processor HP1 if the service is free or is preferably held and executed by the processor HP2 if for paying service because it requires an identification of the subscriber. Thus, as shown in FIG. 1, an application AP1 may be managed by one or the other host processor HP1, HP2, HP3.

2) AP2 type applications wherein the NFC processor NFCR1 is in card emulation mode to be read by conventional RD readers in applications of payment or paying access control (payment machine, metro entrance, etc.). The system NFCS1 is then used like a payment chip card. The program of the application AP2 is preferably held and executed by the secure processor HP2, as shown in FIG. 1, because accessing the service requires an identification of the subscriber.

3) AP3 type applications: the processor NFCR1 is in device mode and dialogs with another device, for example a reader embedded in another NFC system NFCS (for example a mobile phone or a computer). This type of application is usually free and allows data packets to be transferred from one device to another (point-point file transfer in particular). The program of the application AP3 is preferably held and executed by the non secure processor HP1, as shown in FIG. 1, which has a greater computing power than the secure processor HP2 if it is a SIM card processor.

Figure 2:
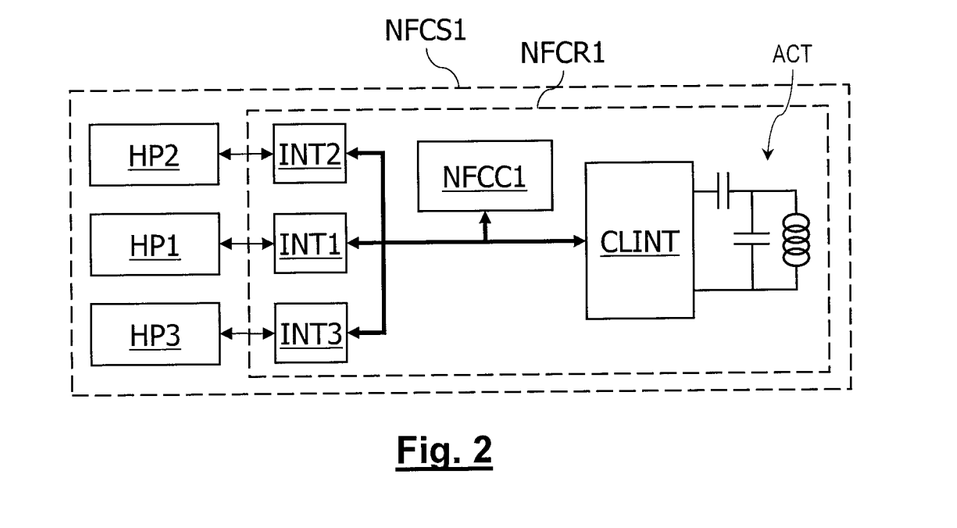
FIG. 2 previously described shows in block form the conventional architecture of a NFC system present in the NFC system of FIG. 1.

FIG. 2 schematically shows an example of architecture of the NFC processor NFCR1 within the system NFCS1. The processor NFCR1 comprises a contactless data sending/receiving interface CLINT coupled to an antenna circuit ACT, wire communication interfaces INT1, INT2, INT3 linked to the interface CLINT, and a data routing or transferring processor NFCC1. The interface INT1 is connected to the host processor HP1, the interface INT2 connected to the host processor HP2 and the interface INT3 to the host processor HP3.

The present invention aims to secure applications allowing a NFC system like a mobile phone to be used as means of payment or access to a service. It is however not wished to add a second connector to connect, in addition to the processor of a SIM card, a secure processor of a secure card like a payment card. In addition, if the phone is equipped with a NFC processor associated to a secure host processor, it is not wished to add to the system another secure host processor or a connector which may only be used to transfer the data of a host processor from a payment card to the host processor associated to the NFC processor.

An idea of the invention is to personalize, with information of payment card or access to a paying service card, the secure host processor of the NFC system or the NFC processor itself if it is secure. It is in addition desirable that the security offered by such a use of a NFC system is at least equivalent to that of a conventional payment card.

Thus, in an embodiment, a method for personalizing a secure processor in a NFC system in order to execute a secure application is provided. According to one embodiment, the method comprises the steps of: establishing communication between a storage medium memorizing in a secured way identification data of a user, and a process unit, transmitting identification data stored in the storage medium to the process unit, the process unit obtaining personalization data corresponding to the user identification data, the process unit obtaining identification data of a NFC system of the user comprising a secure processor, the identification data of the NFC system comprising an encryption key of the secure processor, the process unit encrypting the personalization data using the encryption key, and transmitting to the NFC system the encrypted personalization data, the secure processor receiving the encrypted personalization data, and deciphering the personalization data, and the secure processor memorizing in a secured way the personalization data.

According to one embodiment, the user identification data are transmitted to the process unit by putting in communication the storing medium and a terminal connected to the process unit.

According to one embodiment, the identification data of the NFC system are at least partially supplied by the user to a terminal connected to the process unit.

According to one embodiment, the identification data of the NFC system are at least partially supplied by a contactless link established between the secure processor and a terminal connected to the process unit.

According to one embodiment, the identification data of the NFC system comprise an identifier of a NFC processor and/or a host processor coupled to the NFC processor.

According to one embodiment, the method comprises steps of generating a common secret piece of data shared by the process unit and a terminal connected to the process unit and to which the user has access, and the terminal supplying the secret piece of data to the user, the user supplying it to the NFC system.

According to one embodiment, the NFC system calculates a condensed value by applying a deterministic encryption function to the identification data of the NFC system and the secret piece of data and transmits the calculated condensed value with the identification data of the NFC system to the process unit, and the process unit checks the condensed value by applying the encryption function to the identification data of the NFC system and the secret piece of data it has generated, and stops the personalization process if the received condensed value is different of the calculated condensed value.

According to one embodiment, the NFC system is integrated into a mobile telecommunication terminal, and the encrypted personalization data are transmitted by the process unit to the NFC system through a mobile telecommunication network.

According to one embodiment, the encrypted personalization data are transmitted by the process unit to the NFC system by a contactless link established between a terminal connected to the process unit and comprising a NFC interface in communication with the NFC system.

According to one embodiment, the encrypted personalization data are transmitted to the NFC system through a memory card given to the user and susceptible of being put in communication by a contactless link with the NFC system.

According to one embodiment, the memory card comprises a NFC interface to establish a contactless link with the NFC system.

According to one embodiment, the memory card transmits the encrypted personalization data to the NFC system through a contactless link established with a terminal connected to the memory card and comprising a NFC interface.

According to one embodiment, the encrypted personalization data are transmitted with a condensed value obtained by applying a deterministic encryption function to the encrypted personalization data and the identification data of the NFC system, the NFC system checking the received condensed value by applying the encryption function to the encrypted personalization data received from the process unit and the identification data of the NFC system, and stops the personalization process if the condensed value received is different of the condensed value calculated.

According to one embodiment, the encryption key of the secure processor comprises a public key and a corresponding secret key which are locally generated by the secure processor.

According to one embodiment, the encryption key of the secure processor comprises a public key and a secret key which are inserted into the secure processor with a certificate emitted by a certification authority.

Another embodiment provides a system for personalizing a secure processor in a NFC system in order to execute a secure application. The personalization system comprises: a NFC system of a user, comprising a secure processor, and a process unit configured to: obtain identification data of the user memorized in a secured way in a storage medium, and obtain personalization data corresponding to the user identification data, obtain identification data of a NFC system, the identification data comprising an encryption key of the secure processor, and encrypt the personalization data using the encryption key of the secure processor, and transmit to the NFC system the encrypted personalization data, the secure processor being configured to receive the encrypted personalization data, decipher the personalization data, and memorize in a secured way the personalization data.

According to one embodiment, the personalization system comprises a terminal connected to the process unit and the storage medium, the terminal being configured to extract from the storage medium the user identification data and to transmit them to the process unit.

According to one embodiment, the personalization system comprises a terminal connected to the process unit, the terminal being configured to receive from the user at least partially, the identification data of the NFC system.

According to one embodiment, the personalization system comprises a terminal connected to the process unit and comprising a contactless interface configured to establish a contactless link with the secure processor, the secure processor and the terminal being configured so that the identification data are at least partially transmitted through the contactless link of the NFC system from the secure processor to the terminal.

According to one embodiment, the identification data of the NFC system comprise an identifier of a NFC processor and/or a secure host processor coupled to the NFC processor.

According to one embodiment, the personalization system comprises a terminal connected to the process unit and to which the user has access, the terminal and the process unit being configured to generate a common secret piece of data shared by the process unit and the terminal, the terminal being configured to supply the secret piece of data to the user, the NFC system being configured to receive the secret piece of data of the user.

According to one embodiment, the NFC system is configured to calculate a condensed value by applying a deterministic encryption function to the identification data of the NFC system and the secret piece of data, and to transmit the calculated condensed value with the identification data of the NFC system to the process unit, the process unit being configured to receive and check the condensed value by applying the encryption function to the identification data of the NFC system and the secret piece of data it has generated, and to stop the personalization process if the received condensed value is different of the calculated condensed value.

According to one embodiment, the NFC system is integrated into a mobile telecommunication terminal, the process unit being configured to transmit the encrypted personalization data to the NFC system through a mobile telecommunication network.

According to one embodiment, the personalization system comprises a terminal connected to the process unit and comprising a NFC interface in communication through a contactless link with the NFC system, the process unit, the terminal and the NFC system being configured so that the encrypted personalization data are transmitted from the process unit to the NFC system through the contactless link via the terminal.

According to one embodiment, the personalization system comprises a memory card given to the user and susceptible of being put in communication through a contactless link with the NFC system, the memory card being configured to memorize the encrypted personalization data and transmit them to the NFC system.

According to one embodiment, the personalization system comprises a memory card given to the user and a terminal susceptible of being connected to the memory card and comprising a NFC interface in communication through a contactless link with the NFC system, the memory card being configured to memorize the encrypted personalization data, the memory card, the terminal and the NFC system being configured so that the encrypted personalization data are transmitted from the memory card to the NFC system via the terminal.

According to one embodiment, process unit is configured to transmit the encrypted personalization data with a condensed value obtained by applying a deterministic encryption function to the encrypted personalization data and the identification data of the NFC system, the NFC system being configured to check the received condensed value by applying the encryption function to the encrypted personalization data received from the process unit and the identification data of the NFC system, and to stop the personalization process if the condensed value received is different of the condensed value calculated.

According to one embodiment, the secure processor is configured to generate the public key and the corresponding secret key.

According to one embodiment, the secure processor is configured to receive the public key and the corresponding secret key with a certificate emitted by a certification authority.

Another embodiment provides a process unit for personalizing a secure processor of a NFC system in order to execute a secure application. The process unit is configured to: obtain identification data of a user stored in a secured way in a storage medium, and personalization data corresponding to the user identification data, obtain identification data of a NFC system, the identification data comprising an encryption key of the secure processor, and encrypt the personalization data using the encryption key, and transmit to the NFC system the encrypted personalization data.

According to one embodiment, the identification data of the NFC system comprise an identifier of a NFC processor and/or a host processor coupled to the NFC processor.

According to one embodiment, the process unit is configured to generate a secret piece of data in common with a terminal connected to the process unit, the secret piece of data being shared by the process unit and the terminal.

According to one embodiment, the process unit is configured to receive and check a condensed value obtained by applying an encryption function to the identification data of the NFC system and the secret piece of data it has generated, and to stop the personalization process if the received condensed value is different of the calculated condensed value.

According to one embodiment, the process unit is configured to transmit the encrypted personalization data to the NFC system through a mobile telecommunication network.

According to one embodiment, the process unit is configured to transmit the encrypted personalization data to the NFC system via a terminal connected to the process unit via a network and to the NFC system via a contactless link.

According to one embodiment, the process unit is configured to transmit the encrypted personalization data with a condensed value obtained by applying a deterministic encryption function to the encrypted personalization data and the identification data of the NFC system.

BRIEF DESCRIPTION OF THE SEVERAL VIEWS OF THE DRAWINGS

Example embodiments of the invention will be described below in relation with, but not limited to the appended figures wherein.

DETAILED DESCRIPTION OF THE INVENTION

Figure 3:
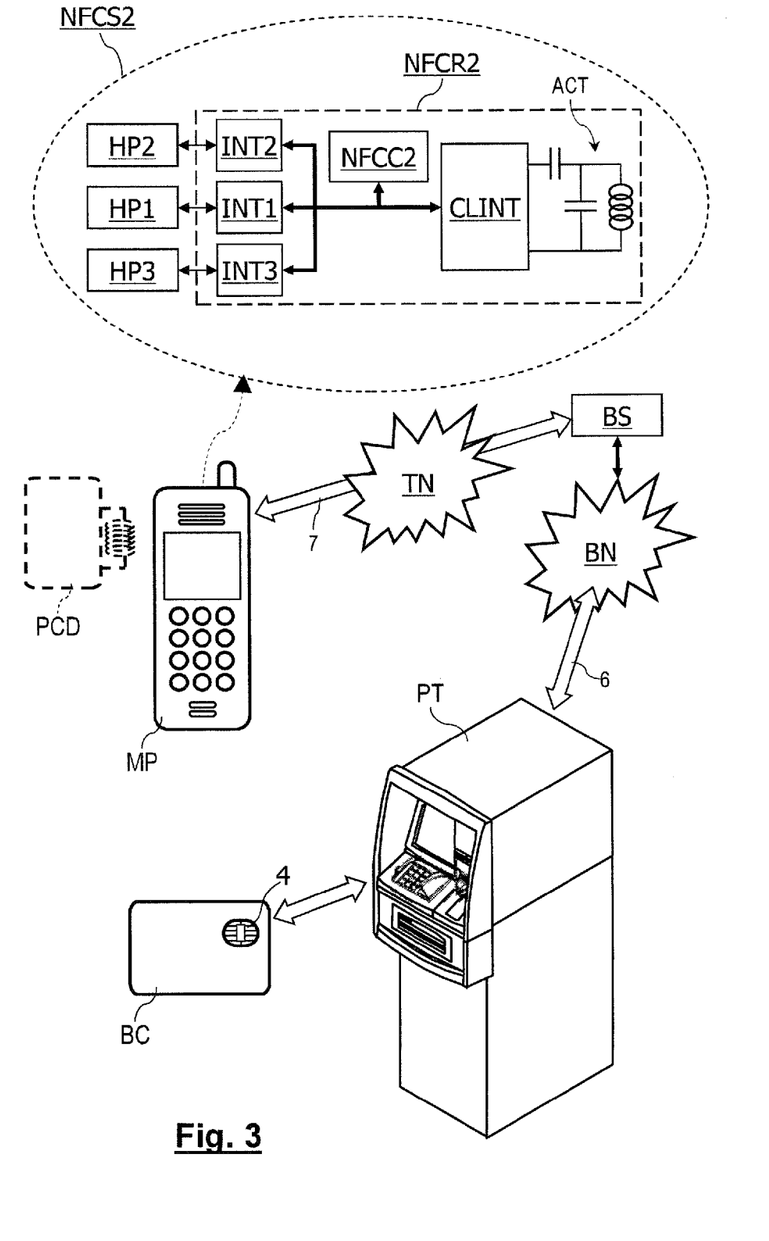
FIG. 3 shows a system comprising a NFC system, wherein embodiments of the invention are implemented.

FIG. 3 shows an example system able to perform personalizing a NFC system in order to execute a secure application with an organism, like a bank. The system comprises a NFC system NFCS2, a terminal PT, a microprocessor card BC like a bank card opened by the organism, and a remote server BS implemented by the organism. The terminal PT comprises a microprocessor card reader to establish a secure contact and/or contactless communication with a microprocessor integrated into a card, like the card BC. The terminal PT has a link 6 with the remote server BS through a data transmission network BN. The card BC has a memory storing in a secured way user identification information regarding the organism, and possibly a secure microprocessor 4 susceptible of starting a secure transaction with the terminal PT.

The terminal PT is for example a payment terminal or an ATM. The card BC is for example a bank card or a payment card.

The system NFCS2 is integrated into a mobile communication terminal like a mobile phone MP and is put at the disposal of the user owning the card BC. The server BS may have an access to a telephone network TN to establish a telephone link 7 with a terminal like the terminal MP. The system NFCS2 comprises a NFC processor NFCR2, and host processors HP1, HP2, HP3. The first host processor HP1 is the main processor of the mobile terminal MP, i.e. the baseband or radiotelephony circuit which controls various peripheral elements of the terminal, like the keyboard, the display, the transmitter, the receiver, the elements for establishing a communication via a mobile telephone network, etc.

The second host processor HP2 may be a secure circuit, for example the secure processor of a SIM card (Subscriber Identification Module) given by a mobile phone carrier, memorizing in particular a subscriber identifier, and a telephone number whereby the subscriber can be called.

The third host processor HP3 is a blank secure processor, i.e. not personalized with information concerning the user.

The processor NFCR1 comprises a contactless data sending/receiving interface CLINT equipped with an antenna circuit ACT, wire communication interfaces INT1, INT2, INT3 linked to the interface CLINT, and a processor NFCC2 performing in particular data routing or transferring functions between the interfaces CLINT, INT1-INT3. The interface INT1 is connected to the host processor HP1, the interface INT2 connected to the host processor HP2 and the interface INT3 to the host processor HP3.

It is to be noted that if the processor NFCR2 or NFCC2 is secured, and can perform the functions of a host processor, the processor HP3 is not required within the framework of the present invention. In the following description, the operations executed by the processor HP3 may therefore be performed by the processor NFCR2.

Figure 4:
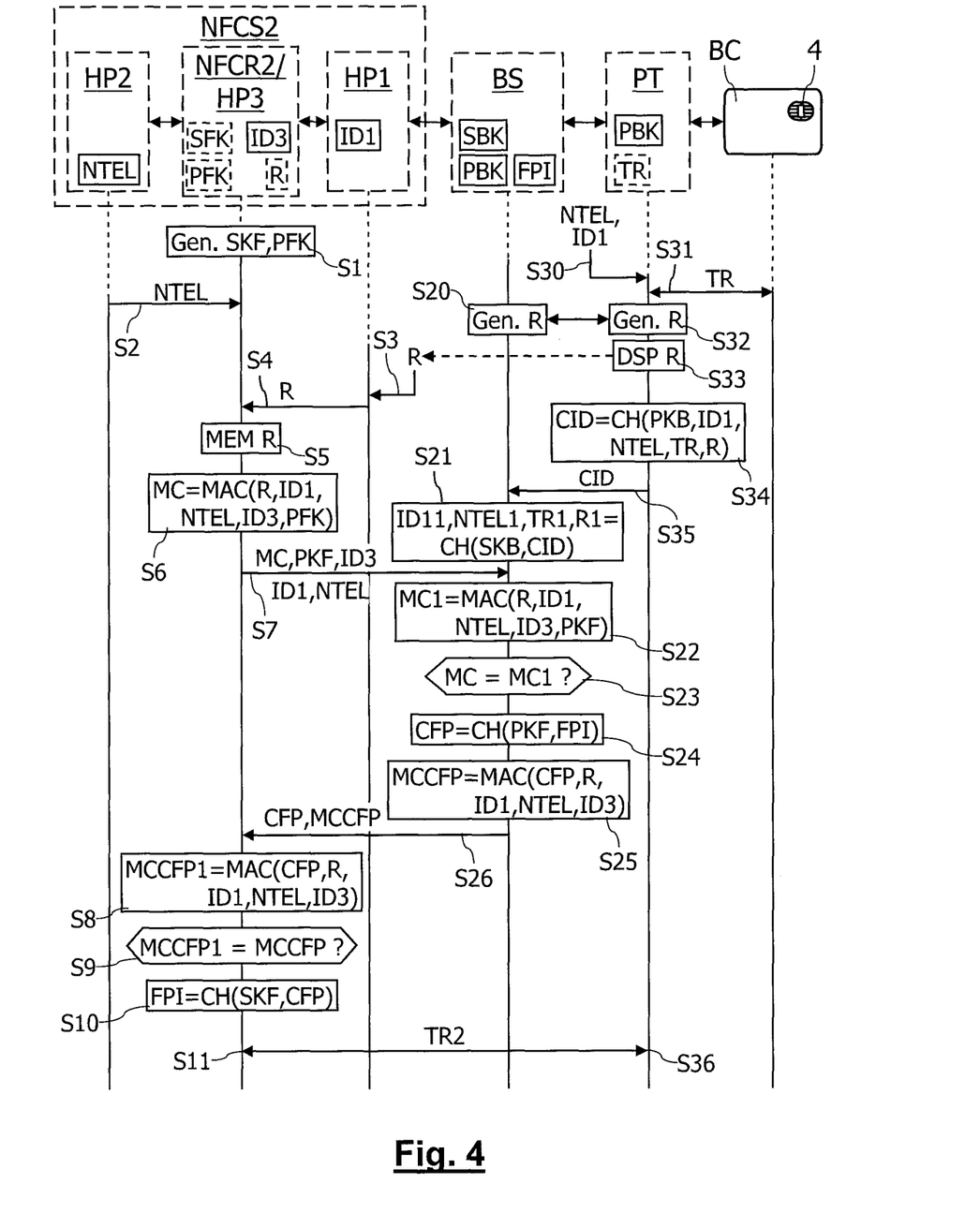
FIG. 4 shows a sequence of data exchange illustrating embodiments of the invention.

FIG. 4 shows a sequence of data exchange of a method for personalizing the processor HP3 or NFCR2 according to one embodiment implemented in the system of FIG. 3.

The remote server BS memorizes a pair of public and private asymmetric keys PKB, SKB of an organism supplying microprocessor cards comprising the card BC, as well as personalization data FPI concerning the user of the card BC within the framework of a secure service managed by the server BS.

The terminal PT memorizes the public key PKB to be able to transmit in a secured way data to the server BS via the network BN. The processor 4 of the card BC may execute a secure application like a payment application of the type B0', EMV®, VISA® or PAYPASS®, installed in the memory thereof.

The host processor HP1 memorizes in a non modifiable way an identifier ID1 allowing the system NFCS2 (or the terminal MP) to be identified in a reliable way. The host processor HP2 memorizes in a non modifiable way, in particular a call number NTEL (phone number) whereby the terminal MP may be called through the network TN. The host processor NFCR2 and/or the host processor HP3 also memorize(s) an identifier ID3 allowing the processor HP3/NFCR2 to be identified in a reliable way.

The sequence shown in FIG. 4 comprises steps S1 to S11 performed by the processor HP3/NFCR2, steps S20 to S26 performed by the remote server BS, and steps S30 to S34 performed by the terminal PT.

The steps S1 and S2 are reset steps during which the processor HP3/NFCR2 generates a pair of public PKF and private SKF asymmetric keys, and receives the call number NTEL of the processor HP2. The keys PKF and SKF may also have been certified by a certification authority and inserted into the processor by an authorized authority. In this case, the step S1 is admittedly not necessary.

The user puts the card BC in communication with the terminal PT which asks him/her to input the number NTEL and the identifier ID1 of the terminal MP. At step S30, the user inputs the information requested, for example by means of a keyboard of the terminal PT. At step S31, the processor 4 of the card BC and the terminal PT establish a secure link between them and exchange transaction data TR comprising in particular information allowing the organism controlling the server BS to identify the user. It is important here that the server BS may reliably identify the user in order to determine the personalization information FPI of the user.

At steps S20 and S32, the server BS and the terminal PT communicate between them to generate a known per se method, a common secret piece of data R known by them only. At step S33, the terminal PT displays on a screen the secret piece of data R so that it is read by the user. At the following steps S34, S35, the terminal PT encrypts, using the public key PKB, the secret piece of data R, the transaction data TR and the identification data of the terminal MP, i.e. the identifier ID1, and the call number NTEL, and transmits the result of the encryption CID to the server BS.

At step S21, the server BS receives the encrypted result CID and deciphers it using the private key SKB corresponding to the public key PKB. The operation of encryption makes it possible to obtain an identifier ID11 of mobile terminal, a call number NTEL1, a secret piece of data R1 and transaction data TR1. The secret piece of data R1 allows a link to be established with the communication established at steps S20 and S32 which has allowed the secret piece of data R to be generated.

At step S3, the user inputs, for example by means of a keyboard, the secret piece of data R s/he has read on the mobile terminal MP. At step S4, the secret piece of data which is thus supplied to the processor HP1 is transmitted to the processor HP3/NFCR2. The processor HP3/NFCR2 memorizes the secret piece of data R at step S5. At the following step S6, the processor HP3/NFCR2 applies to the data ID1, NTEL, R as well as the identifier ID3 and the public key PKF of the processor HP3/NFCR2, a deterministic encryption function MAC like HMAC, 3DES or AES using R as key, and transmits to the server BS the condensed value MC obtained, with the identifiers ID3 and the public key PKF of the processor HP3/NFCR2 and the identifiers ID1 and NTEL of the terminal MP. The transmission of these data is made by any means, as for example by establishing a data transmission link or emitting a message for example of SMS type (Short Message Service) if the terminal MP and the server BS have access to the mobile telephone network TN.

At step S22, the server BC receives these data and applies to the data received ID1, NTEL, ID3, PKF the same function MAC using the secret piece of data R as key. At step S23, the server BC checks the coherence and authenticity of the transaction information TR1 received and deciphered and checks that the obtained condensed value MC1 is identical to the received condensed value MC.

It is to be noted that the server BS can receive several values MC from different mobile terminals executing the personalization sequence. The values deciphered at step S21 are then memorized in a table. Each time data MC, ID1, NTEL, ID3, PKF, are received, the server BS searches in the table for the line containing the identification data received ID1, NTEL of the mobile terminal MP and applies the function MAC to the corresponding data in the table to obtain the condensed value MC1.

The server BS may also check in a data base or by communicating with the mobile phone carrier of the terminal MP, if the number NTEL received is actually that of the user identified in the transaction TR.

If the data received are not coherent or if the two values MC and MC1 are not identical, the server BS does not execute the following steps. Otherwise, the server encrypts at step S24 the personalization data FPI corresponding to the user identity appearing in the transaction information TR, using the public key PKF received from the processor HP3/NFCR2. At step S25, the server BS applies a deterministic encryption function, such as the function MAC to the result of the encryption CFP obtained, concatenated with the identifiers ID1, NTEL and ID3, using the secret piece of data R as key. The condensed value MCCFP obtained by the function MAC is transmitted at step S26 with the encrypted data CFP to the processor HP3/NFCR2, through the mobile terminal MP. This transmission may also be made through the network TN.

At step S8, the processor HP3/NFCR2 applies the same encryption function MAC to the encrypted data CFP received, as well as the secret piece of data R which it has previously memorized and the identification data ID1, NTEL and ID3. At the following step S9, the processor HP3/NFCR2 checks the identity between the condensed value MCCFP received and the condensed value MCCFP1 obtained at step S8. If these values are not identical, the processor HP3/NFCR2 stops the personalization. Otherwise, the processor HP3/NFCR2 deciphers at step S10 the encrypted personalization data CFP using the private key SKF and thus obtains the personalization data FPI which it memorizes in a secured way. The processor HP3/NFCR2 may thus have personalization data supplied by the organism which controls the server BS, these data may be the same personalization data as that memorized by the processor 4.

If an adapted application is previously installed in the processor HP3/NFCR2, a transaction of the same type as that which can be established between the processor 4 and the terminal PT may then be executed. Thus, at steps S11 and S36, a transaction TR2 can be established between the processor HP3/NFCR2 and a contactless reader for example provided in the terminal PT.

To increase the security of the method the organism may send, for example through the server BS, a secret activation code CSA to the user identified thanks to the transaction TR1. To activate the application and thus validate the personalization, the user must then trigger the transaction TR2 during which s/he supplies the activation code to the processor HP3/NFCR2 for example using the keyboard of the terminal MP.

The application may be previously installed in the processor HP3/NFCR2 or loaded from a contactless reader.

The transmission between the processor HP3/NFCR2 and the server BS at step S7 may also be made through the terminal PT and a contactless link, if the terminal PT has contactless transmission means. The terminal PT then receives the data from the processor NFCR2 and forwards them to the server BS.

The transmission between the server BS and the mobile terminal MP at step S26 may also be made in an analog way through the terminal PT and a contactless link between the terminal PT and the processor NFCR2. The transmission may also be made in a deferred way, through a contactless personalization memory card PCD, wherein the data to be transmitted are memorized, the card being given to the user by the organism controlling the server BS. The memory card PCD is transmitted to the user for example by mail, and may be read directly by the processor NFCR2 located near the card.

The personalization memory card PCD may also be a contact card. Thus, the terminal PT which then has contactless transmission means, reads the information memorized in the card PCD and transmits them through a contactless link to the processor NFCR2.

The steps of encryption S24 and deciphering S10 may also use a symmetric and asymmetric encryption combination. Thus, at step S24, a secret key K is generated and used to encrypt the data FPI using a symmetric encryption algorithm. The key K is encrypted in an asymmetric way using the public key PKF. The encrypted data CFP and the encrypted secret key CK are transmitted at step S26 to the processor HP3/NFCR2. At step S10, the processor HP3/NFCR2 uses the private key SKF to decipher the secret key K, and uses the deciphered key K to decipher the deciphered personalization data FPI.

At step S33, the secret piece of data R may be supplied to the user in another way than display on a screen. Thus, it may be printed on a ticket either clearly, or in the form of an optical code (for example a bar code) which is then input in the mobile terminal MP in an adapted way. To that end, the terminal MP may for example be equipped with a lens of camera or film camera and a software module of recognition of printed shapes.

It may also be provided that the data transmitted at step S7 by the processor HP3/NFCR2 are previously encrypted by the processor HP3/NFCR2 or the processor HP1 with the public key PKB of the server BS.

Figure 5:
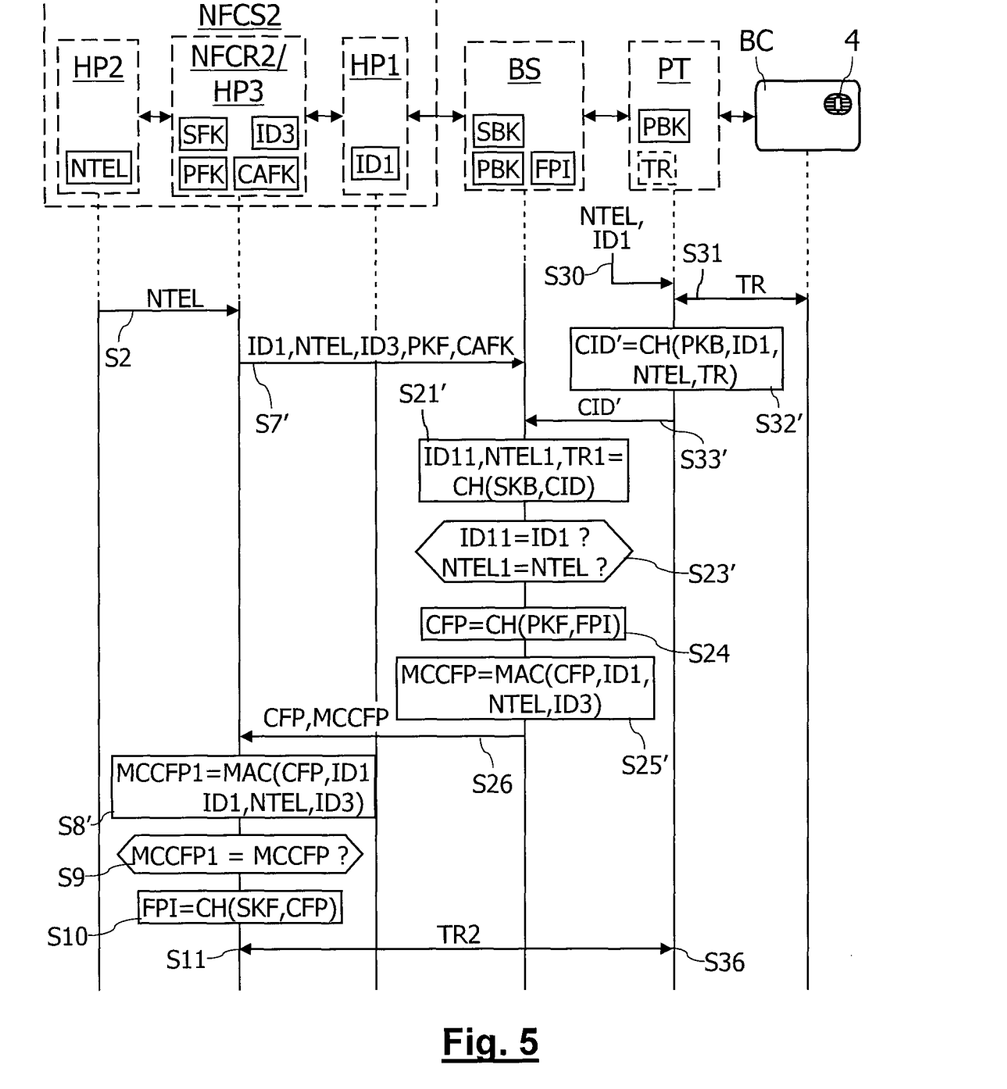
FIG. 5 shows another sequence of data exchange illustrating other embodiments of the invention.

FIG. 5 shows a sequence of data exchange of another embodiment of the personalization method of the host processor HP3 or NFCR2. In relation to the sequence of FIG. 4, the pair of keys PKF, SKF is not generated by the processor HP3/NFCR2 (no step S1), but has been inserted therein during a step of pre personalization of the processor with a verifiable certificate CAFK, guaranteeing the authenticity of the keys. This sequence does not comprise generating and using a secret piece of data R either.

This exchange sequence therefore comprises step S2 executed by the processor HP3/NFCR2 and steps S30, S31 executed by the remote server BS. At the following step S32' the terminal PT encrypts the identification data ID1, NTEL received at step S30 and the transaction information TR using the public key PKB of the remote server BS and sends the encrypted result CID' to the server BS at step S33'.

At step S21', the server BS receives and deciphers the information transmitted by the terminal PT. The remote server thus has the deciphered data ID11, NTEL1 and TR1.

At the same time, at step S7', the processor HP3/NFCR2 sends to the remote server BS the identifiers ID1, NTEL of the mobile terminal MP, as well as the public key PFK thereof, the associated certificate CAFK, and possibly the identifier ID3 thereof. This transmission may be made by establishing a data transmission link or transmitting a message of SMS type through the network TN. This transmission may also be made by establishing a contactless link with the terminal PT which forwards the information received to the server BS through the network BN.

At step S23', the server BS compares the identification data received ID1, NTEL to the identification data ID11, NTEL1 it has deciphered, and checks the certificate CAFK associated to the key PFK. If the data correspond, and if the certificate is valid, the server executes the steps S24 and S26 previously described and S25'. The processor HP3/NFCR2 then executes the steps S8' and the steps S9 to S11 previously described. The steps S25' and S8' differ from the steps S25 and S8 simply in that they do not comprise a secret piece of data R.

As previously, the encryption S24 and deciphering S10 steps may also be performed combining symmetric and asymmetric algorithms. In addition, the transmissions made at steps S7' and S26 may be performed in different ways previously described in reference to FIG. 4, through a contactless link with the terminal PT and/or a personalization memory card PCD. The data transmitted at step S7' may also be transmitted in an encrypted form using the public key PKB of the server BS.

Figure 6:
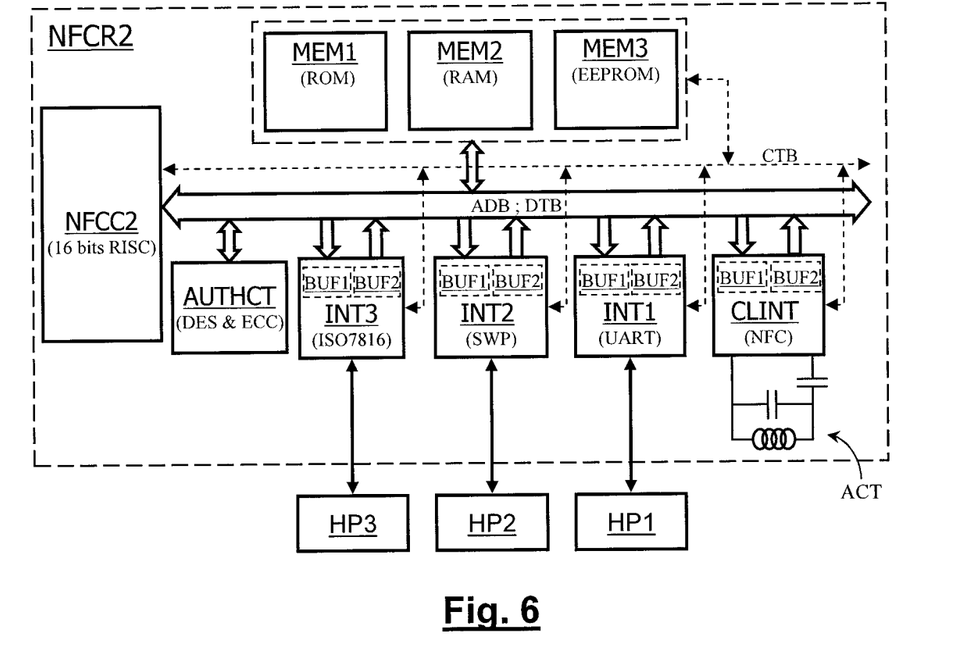
FIG. 6 shows an example of hardware architecture of a NFC processor present in the NFC system.

FIG. 6 shows an example of hardware architecture of the component NFCR2 of FIG. 3. The component comprises:

the processor NFCC2 and the interface CLINT already described, as well as the clock device CLKD (which is optional if the second aspect of the invention is not implemented), a memory array comprising a program memory MEM1 of ROM type (Read Only Memory), a data memory MEM2 of RAM type (Random Access Memory), and an electrically erasable and programmable memory MEM3 of EEPROM type wherein the routing table is stored and the look-up table possibly used by the element DTGEN may also be stored, a connection port INT1 of UART type (Universal Asynchronous Receiving Transmitting), to which the host processor HP1 is here connected, a connection port INT2 of ISO7816 type to which the host processor HP2 is here connected (the processor HP2 being here assumed to be a SIM card), a connection port INT3 of SWP type (Single Wire Protocol) allowing the host processor HP3 to be connected, a data bus DTB and an address bus ADB linking the memory array, the processor NFCC2, the interface CLINT and the ports INT1, INT2, INT3, and a control bus CTB allowing the processor NFCC2 to control and read and/or write access these various elements.

It is to be noted that the buses ADB, DTB, CTB and the interfaces INT1 to INT3 together form what has been previously referred to as the global data path GP of the NFC system (FIG. 4).

The interface CLINT and the ports INT1, INT2, INT3 comprise each an input buffer BUF1 with parallel input and an output buffer BUF2 with parallel output write, read accessible respectively via the data bus and the address bus. The exchange of data forming the routing commands or data frames between the host processors HP1, HP2, HP3 and the processor NFCC2 or the interface CLINT is thus performed by data blocks the size of the buffers BUF1, BUF2, and is clocked by the processor NFCC2.

The processor NFCR2 may be secured and further comprise an authentication and error correction circuit AUTHCT comprising algorithms DES (Data Encryption Standard) and ECC (Elliptic Curve Cryptography), or other encryption algorithms. In that case, executing the sequence of FIG. 4 or 5 does not require the presence of the host processor HP3 and therefore the presence of the port INT3.

Figure 7:
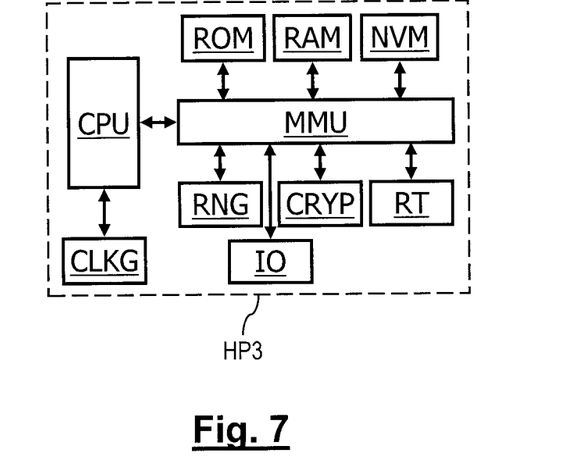
FIG. 7 shows an example of hardware architecture of a secure host processor present in the NFC system.

FIG. 7 shows an example of hardware architecture of a secure host processor like the host processor HP3 present in the NFC system. In FIG. 7, the processor HP3 comprises a process unit CPU with one or more bank registers, various volatile RAM memories, ROM memories, and non volatile NVM memories for example of the EEPROM or Flash type, a unit for managing the memory MMU, a clock signal generator CLKG, input/output interfaces 10 and sending/receiving interfaces RT, for example of the UART type, dedicated calculation circuits, and in particular a circuit for generating random numbers RGEN, an encryption calculation circuit CRYP.

It will be clear to those skilled in the art that the present invention is susceptible of various other embodiments and applications. In particular, the invention is not limited to a payment application. The invention may also more globally apply to any personalization of a NFC processor of a NFC system requiring protecting and guaranteeing the confidentiality and authenticity of the personalization data. Thus, the invention may particularly apply to the transfer of person identity information, within the framework of an application of identity check. The identity information may comprise an identity picture and biometric data.

In addition, the server BS may more generally consist of a simple secure process unit having access to the data concerning the users required for initiating and managing transactions linked to the application installed in the secure processor HP3/NFCR2 or the processor 4.

Moreover, the encryption keys PKF, SKF are not necessarily keys of an asymmetric encryption algorithm. It may be provided for example that the processor HP3/NFCR2 transmits to the server BS in a secured way a secret key to be used to encrypt the personalization data to be transmitted at step S26.

We claim:

1. A method for personalizing a secure processor in a Near Field Communication (NFC) system to execute a secure application, the method comprising steps of:

establishing a communication link between a remote processor and a storage medium carried by a user, the storage medium memorizing in a secured way user identification data identifying the user, transmitting by the storage medium the user identification data stored in the storage medium to the remote processor, obtaining by the remote processor user personalization data corresponding to the user identification data, the user personalization data allowing a secure application to be executed in connection with the user identification data, obtaining by the remote processor using the user identification data, NFC system identification data identifying a NFC system of the user, the NFC system, the storage medium and the remote processor being distinct devices from one another, the NFC system comprising a secure processor and an NFC interface for contactless communications, the NFC system identification data comprising an encryption key of the secure processor, encrypting by the remote processor the user personalization data using the encryption key, transmitting by the remote processor the encrypted user personalization data to the NFC system, receiving and deciphering the encrypted user personalization data by the secure processor, and memorizing in a secured way the user personalization data by the secure processor.

2. The method according to claim 1, wherein the user identification data are transmitted to the remote processor by putting in communication the storage medium and a terminal connected to the remote processor.

3. The method according to claim 1, wherein the identification data of the NFC system are at least partially supplied by the user to a terminal connected to the remote processor.

4. The method according to claim 1, wherein the identification data of the NFC system are at least partially supplied to the secure processor by a contactless link established between the NFC interface of the NFC system and a terminal connected to the remote processor.

5. The method according to claim 1, wherein the identification data of the NFC system comprise an identifier of a NFC processor and/or a host processor coupled to the NFC processor.

6. The method according to claim 1, comprising steps of generating a common secret data shared by the remote processor and a terminal connected to the remote processor and to which the user has access, and the terminal supplying the secret data to the user, then the user supplying it to the NFC system.

7. The method according to claim 6, wherein:
a processor of the NFC system calculates a condensed value by applying a deterministic encryption function to the identification data of the NFC system and the secret data, and the NFC system transmits the calculated condensed value and the identification data of the NFC system to the remote processor, and
the remote processor calculates a condensed value by applying the deterministic encryption function to the identification data of the NFC system and the secret data, and stops a personalization process of the secure processor if the received condensed value is different from the calculated condensed value.

8. The method according to claim 1, wherein the NFC system is integrated into a mobile telecommunication terminal and the encrypted user personalization data are transmitted by the remote processor to the NFC system through a mobile telecommunication network.

9. The method according to claim 1, wherein the encrypted user personalization data are transmitted by the remote processor to the NFC system by a contactless link established between a terminal connected to the remote processor and comprising a NFC interface in communication with the NFC interface of the NFC system.

10. The method according to claim 1, wherein the encrypted user personalization data are transmitted to the NFC system through a memory card given to the user and susceptible of being put in communication through a contactless link with the NFC interface of the NFC system.

11. The method according to claim 10, wherein the memory card comprises a NFC interface to establish a contactless link with the NFC interface of the NFC system.

12. The method according to claim 10, wherein the memory card transmits the encrypted user personalization data to the NFC system through a contactless link established with a terminal connected to the memory card and comprising the NFC interface.

13. The method according to claim 1, wherein
the remote processor transmits to the NFC system the encrypted user personalization data with a condensed value obtained by applying a deterministic encryption function to the encrypted user personalization data and the identification data of the NFC system, and
the NFC system receives the encrypted user personalization data and the condensed value, calculates a condensed value by applying the deterministic encryption function to the encrypted user personalization data received from the remote processor and the identification data of the NFC system, and stops a personalization process of the secure processor if the condensed value received is different from the condensed value calculated.

14. The method according to claim 1, wherein the encryption key of the secure processor comprises a public key and a corresponding secret key which are locally generated by the secure processor.

15. The method according to claim 1, wherein the encryption key of the secure processor comprises a public key and a secret key which are inserted into the secure processor with a certificate emitted by a certification authority.

16. A system for personalizing a secure processor in a Near Field Communication (NFC) system to execute a secure application, the system comprising:
a NFC system of a user, comprising a secure processor and an NFC interface for contactless communications, and
a remote processor configured to:
receive user identification data identifying the user, by a communication link established with a storage medium carried by the user and memorizing in a secured way the user identification data,
obtain user personalization data corresponding to the user identification data,
obtain NFC system identification data identifying the NFC system using the user identification data, the NFC system identification data comprising an encryption key of the secure processor, and
encrypt the user personalization data using the encryption key of the secure processor, and transmit to the NFC system the encrypted user personalization data,
the secure processor being configured to receive and decipher the encrypted user personalization data, and to memorize in a secured way the user personalization data, wherein the NFC system, the remote processor and the storage medium are distinct devices from one another.

17. The system according to claim 16, comprising a terminal connected to the remote processor and the storage medium, the terminal being configured to extract from the storage medium the user identification data and to transmit the user identification data to the remote processor.

18. The system according to claim 16, comprising a terminal connected to the remote processor, the terminal being configured to receive from the user at least partially, the identification data of the NFC system.

19. The system according to claim 16, comprising a terminal connected to the remote processor and comprising a contactless interface configured to establish a contactless link with the secure processor, the secure processor and the terminal being configured so that the user identification data are at least partially transmitted through the contactless link of the NFC system from the secure processor to the terminal.

20. The system according to claim 16, wherein the identification data of the NFC system comprise an identifier of a NFC processor and/or a secure host processor coupled to the NFC processor.

21. The system according to claim 16, comprising a terminal connected to the remote processor and to which the user has access, the terminal and the remote processor being configured to generate a common secret data shared by the remote processor and the terminal, the terminal being configured to supply the secret data to the user, the NFC system being configured to receive the secret data from the user.

22. The system according to claim 21, wherein:
the NFC system is configured to calculate a condensed value by applying a deterministic encryption function to the identification data of the NFC system and to the secret data, and to transmit the calculated condensed value with the identification data of the NFC system to the remote processor, and the remote processor is configured to receive and check the condensed value, to calculate a condensed value by applying the encryption function to the identification data of the NFC system and to the secret data it has generated, and to stop a personalization process of the secure processor if the received condensed value is different from the calculated condensed value.

23. The system according to claim 16, wherein the NFC system is integrated into a mobile telecommunication terminal, the remote processor being configured to transmit the encrypted user personalization data to the NFC system through a mobile telecommunication network.

24. The system according to claim 16, comprising a terminal connected to the remote processor and comprising a NFC interface in communication through a contactless link with the NFC system, the remote processor, the terminal and the NFC system being configured so that the encrypted user personalization data are transmitted from the remote processor to the NFC system through the contactless link via the terminal.

25. The system according to claim 16, comprising a memory card given to the user and susceptible of being put in communication through a contactless link with the NFC system, the memory card being configured to memorize the encrypted user personalization data and transmit the encrypted user personalization data to the NFC system.

26. The system according to claim 16, comprising a memory card given to the user and a terminal susceptible of being connected to the memory card and comprising a NFC interface in communication through a contactless link with the NFC system, the memory card being configured to memorize the encrypted user personalization data, the memory card, the terminal and the NFC system being configured so that the encrypted user personalization data are transmitted from the memory card to the NFC system via the terminal.

27. The system according to claim 16, wherein:
the remote processor is configured to transmit the encrypted user personalization data with a condensed value obtained by applying a deterministic encryption function to the encrypted user personalization data and the identification data of the NFC system,
the NFC system is configured to receive the condensed value, to calculate a condensed value by applying the encryption function to the encrypted user personalization data received from the remote processor and to the identification data of the NFC system, and to stop a personalization process of the secure processor if the received condensed value is different of the calculated condensed value.

28. The system according to claim 16, wherein the secure processor is configured to generate the encryption key of the secure processor which is a public key and a secret key corresponding to the public key.

29. The system according to claim 16, wherein the secure processor is configured to receive the encryption key of the secure processor which is a public key and a secret key corresponding to the public key, with a certificate emitted by a certification authority.

30. An apparatus comprising a processor for personalizing a secure processor of a Near Field Communication (NFC) system in order to execute a secure application, the processor configured to:
receive user identification data identifying a user, by a communication link established with a storage medium carried by the user and memorizing in a secure way the user identification data,
obtain user personalization data corresponding to the user identification data,
obtain NFC system identification data identifying a NFC system of the user using the user identification data, the NFC system being separate from the storage medium, the identification data comprising an encryption key of a secure processor of the NFC system, and
encrypt the user personalization data using the encryption key, and transmit to the NFC system the encrypted user personalization data, wherein the NFC system, the processor and the storage medium are distinct devices from one another.

31. The apparatus according to claim 30, wherein the identification data of the NFC system comprise an identifier of a NFC processor and/or a host processor coupled to the NFC processor.

32. The apparatus according to claim 30, wherein the processor is further configured to generate a secret data, the secret data being shared by the processor and a terminal which the processor is connected to.

33. The apparatus according to claim 32, wherein the processor is further configured to:
receive a condensed value,
calculate a condensed value by applying an encryption function to the identification data of the NFC system and to the secret data, and
stop a personalization process of the secure processor if the received condensed value is different of the calculated condensed value.

34. The apparatus according to claim 30, wherein the processor is further configured to transmit the encrypted user personalization data to the NFC system via a mobile telecommunication network.

35. The apparatus according to claim 30, wherein the processor is further configured to transmit the encrypted user personalization data to the NFC system via a terminal connected to the processor via a network and to the NFC system via a contactless link.

36. The apparatus according to claim 30, wherein the processor is further configured to transmit the encrypted user personalization data with a condensed value obtained by applying a deterministic encryption function to the encrypted user personalization data and the identification data of the NFC system.

* * * * *